United States Patent [19]

Sawazaki et al.

[11] 3,946,959
[45] Mar. 30, 1976

[54] ENDLESS TAPE-RUNNING APPARATUS

[75] Inventors: Norikazu Sawazaki, Yokohama; Hiroyuki Tsukamoto, Kawasaki; Motoi Yagi, Zushi, all of Japan

[73] Assignee: Tokyo Shibaura Electric Co., Ltd., Kawasaki, Japan

[22] Filed: Mar. 28, 1974

[21] Appl. No.: 455,743

[30] Foreign Application Priority Data
Apr. 4, 1973 Japan.................. 48-37747
Apr. 28, 1973 Japan.................. 48-47353

[52] U.S. Cl. .......................... 242/55.19 A
[51] Int. Cl.² .......................... B65H 17/48
[58] Field of Search ............ 242/55.19 A, 55.19 R; 360/93

[56] References Cited
UNITED STATES PATENTS

| | | | |
|---|---|---|---|
| 1,713,921 | 5/1929 | Rouiller | 242/55.19 A |
| 2,844,369 | 7/1958 | Singer | 242/55.19 A |
| 2,853,923 | 9/1958 | Daniel | 242/55.19 A X |
| 3,155,335 | 11/1964 | Maeder | 242/55.19 A |
| 3,161,362 | 12/1964 | Smith | 242/55.19 A |
| 3,295,782 | 1/1967 | Stark et al. | 242/55.19 A |
| 3,443,768 | 5/1969 | Liddle et al. | 242/55.19 A |
| 3,481,551 | 12/1969 | Steelman | 242/55.19 A |
| 3,482,792 | 12/1969 | Auld | 242/55.19 A |

Primary Examiner—Edward J. McCarthy
Attorney, Agent, or Firm—Oblon, Fisher, Spivak, McClelland & Maier

[57] ABSTRACT

An endless tape-running apparatus comprises guide means for guiding an endless tape taken up on a reel, starting with the innermost periphery of the tape roll on the reel and again taking up the running tape on the outermost periphery of the tape roll, drive means for running the tape along said guide means at a higher speed than 5 meters per second, and a restricting means for preventing the endless tape roll rotated by said drive means from having its diameter broadened due to a great centrifugal force being applied to the endless tape roll by said rapid rotation.

5 Claims, 13 Drawing Figures

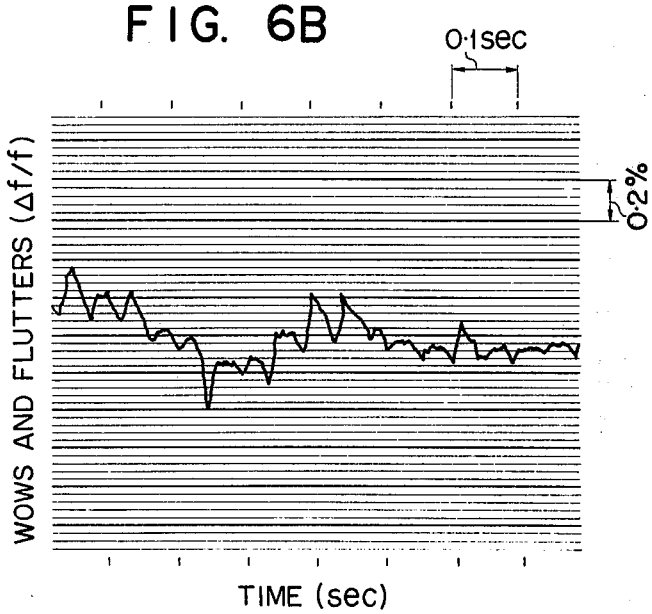
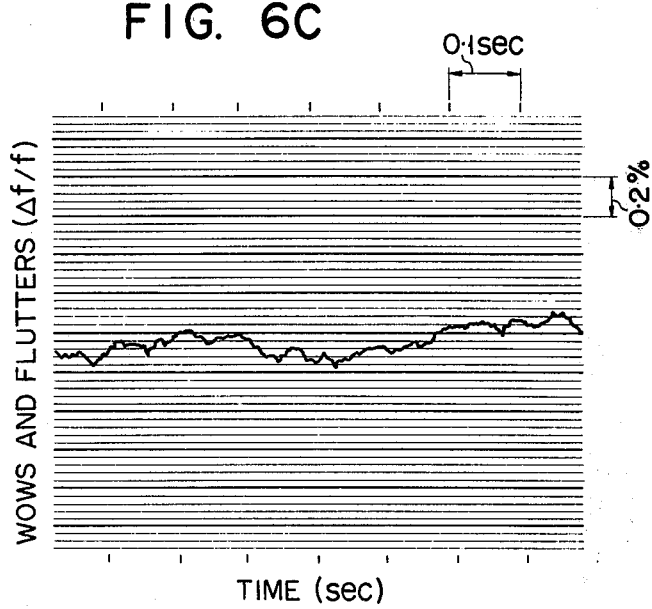

ENDLESS TAPE-RUNNING APPARATUS

This invention relates to an endless tape-running apparatus and more particularly to an endless tape-running apparatus used in recording and reproducing video signals.

A video tape recorder (VTR) is generally used as an apparatus for recording and reproducing video signals such as those of television. With the prior art apparatus of such type, the endless tape is scanned at a high speed in recording as well as in reproduction. To this end, a rotary magnetic head is provided, and video signals are recorded and reproduced obliquely in the endless tape. As the result, a tracking servo system has to be used, and moreover the arrangements of both rotary magnetic head and tape-running means unavoidably become complicated, failing to attain the miniaturization of the entire video tape recorder and leading to its high cost. Further, the conventional VTR has the drawbacks that recording can not be made in a magnetic tape with a fully increased density, because a track pitch is not allowed to be much decreased in view of demand for the tracking accuracy and the interchangeability of a tape, thus giving rise to the considerable consumption of tapes.

On the other hand, it may be theoretically contemplated to use a stationary magnetic head to meet the required simplification and miniaturization of the VTR. With application of such stationary magnetic head, however, the recording and reproduction of high frequency signals like video signals requires a magnetic tape to be run at as high a speed as more than 3 meters per second. As the result, a very long endless tape has to be used, preventing its stable movement. For example, where 10 tracks are formed in a common ½ inch wide VRT endless tape with a standard track pitch of 1 mm and said tape is run at a speed of 3.3 meters per second, then recording and reproduction of 30 minutes will require a tape as long as about 600 meters. Hitherto, the running of such a long endless tape at the above-mentioned high speed has been accompanied with the difficulties that not only the occurrence of wows and flutters resulting from the uneven movement the endless tape rendered a reproduced image unstable, but also the undesirable seizure of the endless tape by a particular part of its passageway led to its stop or breakage. Use of such a long endless tape as described above makes it necessary to broaden a tape reel, provide a large capacity motor and elongate the loosened damper portion of the endless tape, thus failing to render the VTR as compact as desired.

It is accordingly the object of this invention to provide an endless tape-running apparatus admitting of miniaturization and simplification and particularly adapted for the recording and reproduction of video signals which not only enables an endless tape to travel in a stable condition, but also allows a track pitch to be decreased, thereby eliminating the necessity of using a much long endless tape.

This invention can be more fully understood from the following detailed description when taken in conjunction with the accompanying drawings, in which.

Figure 6A:
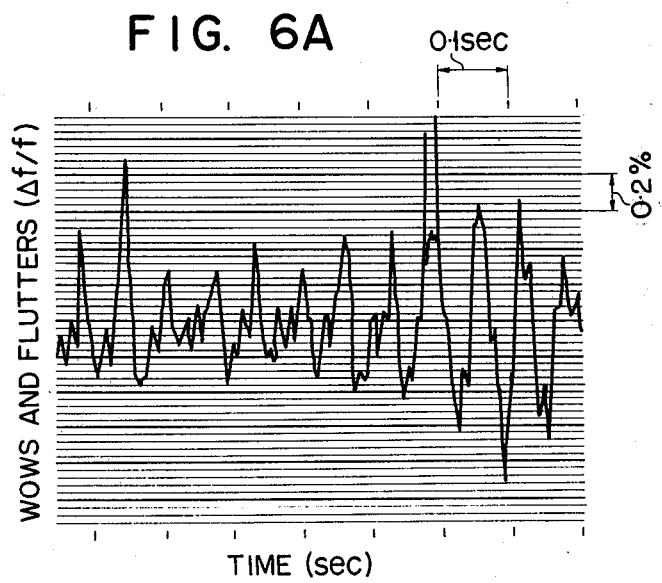
Figure 6D:
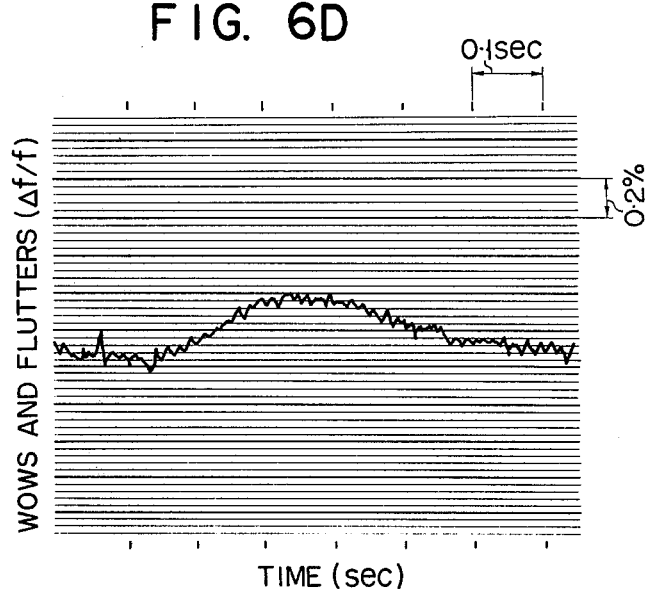
Figure 7:
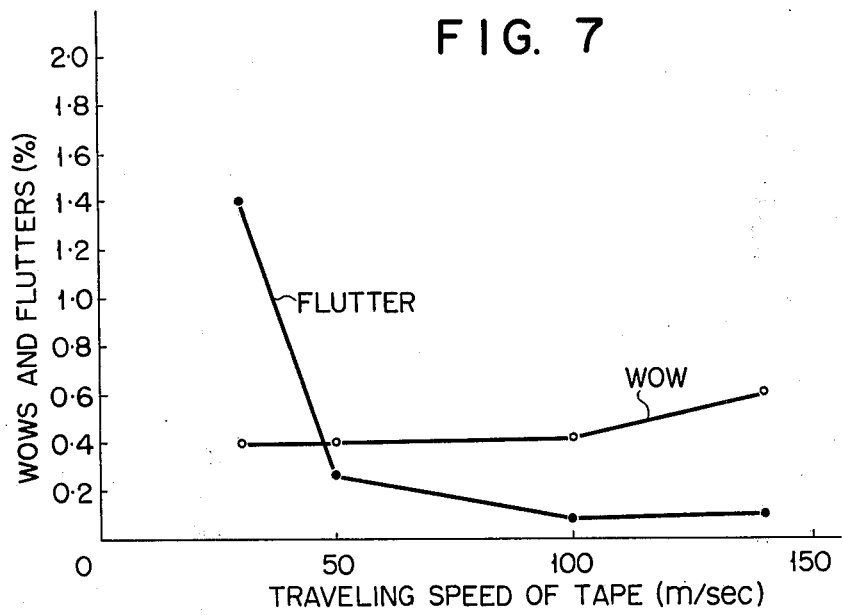
Figure 8:
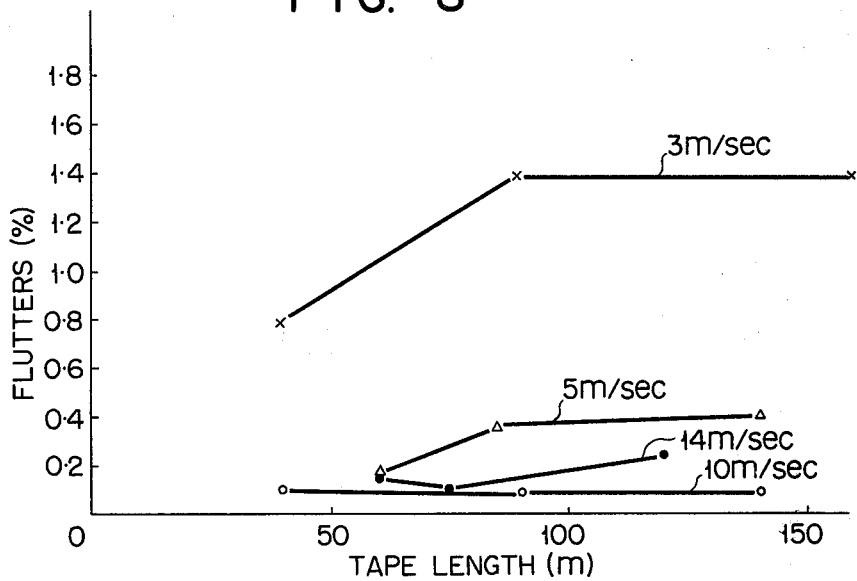
Figure 9:
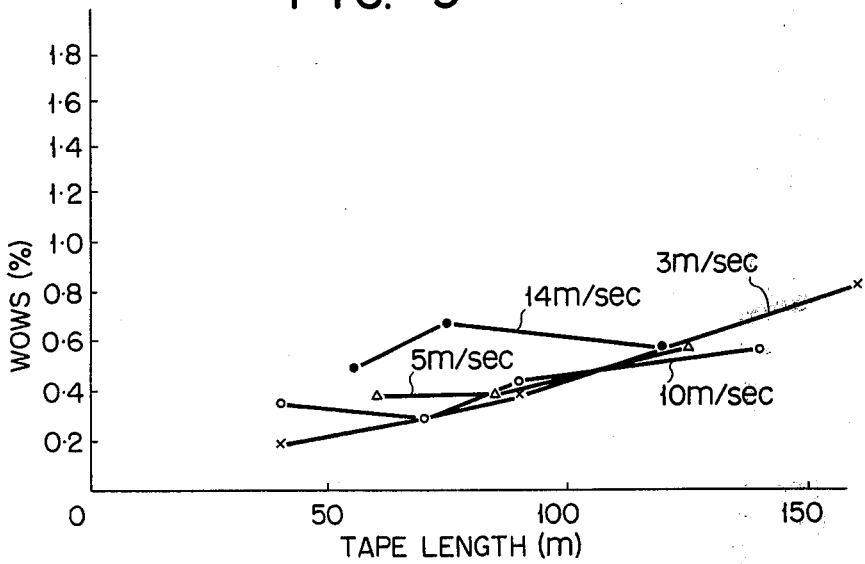

FIGS. 6A, 6B, 6C and 6D and FIG. 7 indicate the results of measuring a relationship between the speed of an endless tape run by the apparatus of the invention and the wow-flutter characteristics of reproduced video signals; and FIGS. 8 and 9 present the results of measuring a relationship between the length of an endless tape and the occurrence of flutters and a relationship between said length and the appearance of wows, with the traveling speed of the endless tape taken as a parameter.

The tape-running apparatus of this invention characteristically applies a sufficient restricting force to a roll of an endless tape to offset a great centrifugal force to which the endless tape roll is subjected when rotated at a higher speed than 5 meters per second, thereby reducing those varieties in the tension of the respective turns of an endless tape roll which are caused by the different magnitudes of friction prevailing between the adjacent turns.

The present inventors have experimentally found that the unstable travel of an endless tape driven by the apparatus using a stationary magnetic head most predominantly originates with the varying tensions of the turns of the tape roll. An overall tension T applied to the endless tape roll as a whole mainly arises from a sum of a tensional force Tc caused by the centrifugal force to which the respective turns of the rotating endless tape roll are subjected, a frictional force Tf acting between the adjacent turns of the tape roll and a frictional force Tr occurring between a member supporting the endless tape roll and the contact surface of each turn pressed against said supporting member. The above-mentioned overall tension T may be expressed by the following equation:

$$T = T_c + T_f + T_r \ldots \quad (1)$$

The tensional force Tc used in the above equation can be theoretically determined. With the travelling speed of the endless tape represented by v and the mass of the unit length of the tape by m, then the following equation results:

$$T_c = mv^2 \ldots \quad (2)$$

Where the speed of the endless tape roll is constant, then the tensional force Tc is also constant. In contrast, the above-mentioned frictional forces always vary with the ununiform quality of an endless tape as well as due to said frictions taking place at different spots between the adjacent turns of the endless tape roll or between the contact surfaces of said turns and the support of the endless tape roll, also because these frictional forces change with time. With an aggregate of these fluctuating frictional forces designated as Tv, then the following equation is obtained:

$$T = Tc + Tv \ldots \quad (3)$$

Figure 1:
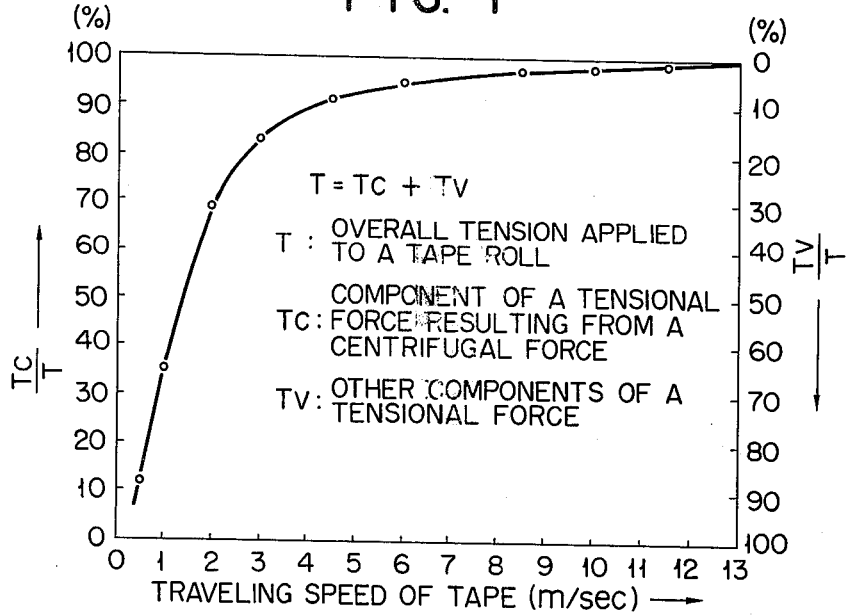
FIG. 1 is a curve diagram presenting a relationship between the traveling speed and tension of an endless tape for better understanding of this invention.

The overall tension T applied to the entire endless tape has an experimentally determinable relationship with a tension applied to the tape drawn out of the endless tape roll and consequently can be defined also experimentally. Where said overall tension T was experimentally determined while changing the traveling speed $v$ of the endless tape, then it was recognized that said traveling speed $v$ presented a relationship indicated by the curve of FIG. 1 with the ratio $Tc/T$ of the tensional force $Tc$ to the overall tension T or the ratio $Tv/T$ of the above-mentioned aggregate frictional force $Tv$ to the overall tension T. Referring to FIG. 1, the abscissa represents the traveling speed v of the tape and the ordinate denotes the ratio of $Tc/T$ and $Tv/T$, with the speed expressed in n/sec and the ratio in percent. As from FIG. 1 it may be understood that the ratio of the aggregate frictional force $Tv$ including variable components to the overall tension T progressively decreases in the form of a second order curve as the traveling speed of the tape rises, whereas the ratio of the constant tensional force $Tc$ to the overall tension T becomes progressively larger in the form of said second order curve with the increasing traveling speed of the tape.

The experimental results set forth in FIG. 1 can be naturally expected from the equation (2). Namely, the tensional force $Tc$ increases in proportion to the square of the traveling speed of the tape, whereas the aggregate frictional force $Tv$ is not much affected by said traveling speed.

Variations in the overall tension of the tape cause a reproduced image to present wows and flutters. If, therefore, these variations are reduced, then it will be possible to minimize fluctuations in the frequency of reproduced video signals to a desired extent, namely, to a lower level than 0.1 percent for wows and to a lower level than 0.04 percent for flutters. To this end, it is necessary that a tensional force $Tc$ little subject to variations be increasingly applied to an endless tape roll relative to an aggregate frictional force $Tv$ presenting considerable changes.

The endless tape-running apparatus of this invention further includes means for frictionally suppressing or restricting the endless tape roll from broadening of the diameter of the tape roll. As mentioned above, a centrifugal force applied to the endless tape roll causes said roll to be broadened in diameter. If, therefore, said broadening is properly limited by furnishing the endless tape roll with a force opposing said centrifugal force, then it will be possible to reduce a contact pressure prevailing between the respective adjacent turns of the endless tape roll, thereby minimizing a frictional force occurring between said turns and in consequence the resultant tensional force $Tf$. The endless tape-running apparatus of this invention provided with the above-mentioned two devices enables the endless tape to be run very stably at a high speed in recording and reproduction, thereby not only offering a distinct reproduced image and good picture quality but also admitting of the miniaturization and structural simplification of the entire apparatus due to the use of a stationary magnetic head.

There will now be described by reference to FIGS. 2 to 4 an endless tape-running apparatus according to an embodiment of this invention.

Figure 2:
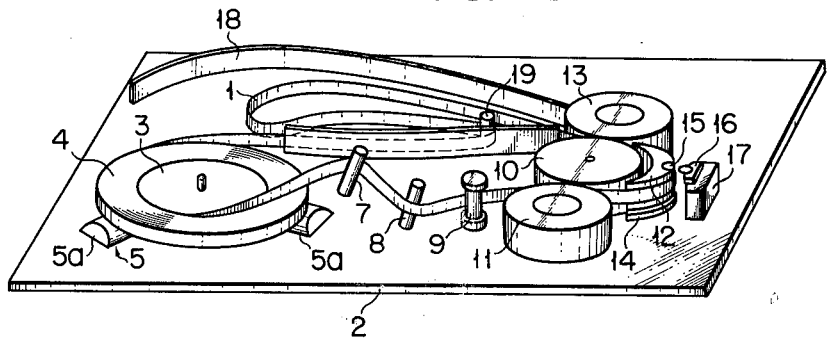
FIG. 2 is a schematic oblique view of a tape-running apparatus according to an embodiment of the invention.
Figure 3:
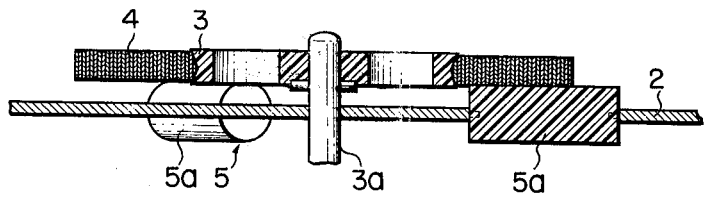
FIG. 3 is a detailed sectional view indicating the position of rolls jointly used as restricting means in the apparatus of FIG. 2.

Referring to FIG. 2, an endless tape 1 is of magnetic type as is well known in this particular field, though this invention is not limited thereto. Said endless magnetic tape 1 may consist of the one in which a layer of lubricant such as graphite is coated on the underside of a tape base whose upper surface is formed of a magnetic layer, in order to provide a smooth friction-free slide between the respective turns of the tape roll. The endless tape 1 is wound with an optional radius about a reel 3 fitted to a rotatable shaft 3a at a prescribed distance from a substrate 2. The radius of a roll 4 of the endless tape 1 is determined by the entire length and thickness of the endless tape 1 and the radius of the reel 3. As is well known in this field, the endless tape 1 is initially taken up on the reel 3 so as to be later drawn out, starting with the innermost periphery of the tape roll 4 and again wound on the outermost periphery of the remaining tape roll 4 through the later described driving system. The tape roll 4 has its underside contacted with restricting means 5, thereby preventing the diameter of the tape roll 4 from being enlarged due to a centrifugal force being applied to the tape roll 4 when it is rapidly rotated. According to a preferred embodiment, this restricting means 5 includes three round columnar rubber rolls 5a horizontally extending at a substantially equal interval around the rotary shaft 3a of the reel 3 in the radial direction of said reel 3. Each rubber roll 5a is supported in the corresponding opening formed in the substrate 2 so as to rotate in a plane perpendicular to the surface of the substrate 2. The upper half sections of the respective rubber rolls 5a project above the substrate 2. These projecting portions are contacted with the lower end face of the tape roll 4. First and second stational guide poles 7, 8 are stood on the substrate 2 at a prescribed interval in inclined states. The tape drawn out of the innermost side of the tape roll 4 is guided by the first and second poles 7, 8 in succession so as to allow the surface of the tape to be vertical with the surface of the substrate 2. A third stational guide pole 9 is erected straight upright on the substrate, assisting the drawn out tape 1 to run with its lower edge parallel with the surface of the substrate 2. The third guide pole 9 is provided with flanges at both top and bottom ends to restrict the vertical shaking of the traveling tape 1. After passing the guide pole 9, the traveling tape 1 is guided between a capstan 10 rotated by a drive means (not shown) and an inlet pinch roll 11 pressed against the capstan 10. The capstan 10 and pinch roll 11 may be of the known type. When rotated by the drive means, the capstan 10 advances the tape 1 in cooperation with the pinch roll 11. The capstan 10 is preferred to have as large a diameter as possible, and, according to this embodiment, is chosen to be a stainless steel one 53 mm in diameter. The pinch roll 11 has its peripheral wall formed of rubber. The drive means may consist of a bipolar synchronous motor of 3600 r.p.m. actuated by a commercial power source of 60 Hz. Where the rotary shaft of said motor is coupled with the capstan 10, the tape 1 travels at a speed of about 10 meters per second. An outlet pinch roll 13 is rotatably provided on the opposite side of the capstan 10 to the inlet pinch roll 11. Further, a crescent-shaped guide 12 is disposed near the outer side of the capstan 10 so as to face a magnetic head 16. Accordingly, the tape 1 conducted between the inlet pinch roll 11 and capstan 10 moves forward while sliding along said head-facing guide 12 and further passes between the capstan 10 and the outlet pinch roll 13. The magnetic head-facing guide 12 is so positioned on the substrate 2 as to set the outer segmental surface of said head-facing guide 12 slidably contacted by the traveling tape 1 exactly at right angles to the surface of the substrate 2. The bottom end flange of the magnetic head-facing guide 12 is provided with a guide rail 14 to restrict the horizontal shaking of the traveling tape 1. The outer segmental surface of the magnetic head-facing guide 12 is bored at the center with a notched portion 15 to provide a free space between the traveling tape 1 and said segmental surface. The magnetic head 16 facing said notched portion 15 is fixed on a head rest 17. When mechanically moved across the traveling tape 1, then the magnetic head 16 can attain multichannel recording and reproduction. Further provided on the substrate 2 is a tape-buffering device including a fourth guide pole 19 erected near the outlet pinch roll 13 and a guide wall 18 extending from the proximity of the outlet pinch roll 13 to that of the reel 3 so as to hold the loosened cushioning portion of the traveling tape 1. The tape 1 which has passed between the capstan 10 and outlet pinch roll 13 first moves forward along the guide wall 18 and later is brought back to the fourth guide pole 19. Thereafter the tape 1 is again taken up on the outermost periphery of the tape roll 4 wound about the reel 3 by passing said fourth guide pole 19. In other words, the tape 1 leaving the outlet pinch roll 13 is conducted to the original tape roll 4 in a buffered state by being guided in the form of the letter S by the fourth guide pole 19 and guide wall 18.

Figure 4:
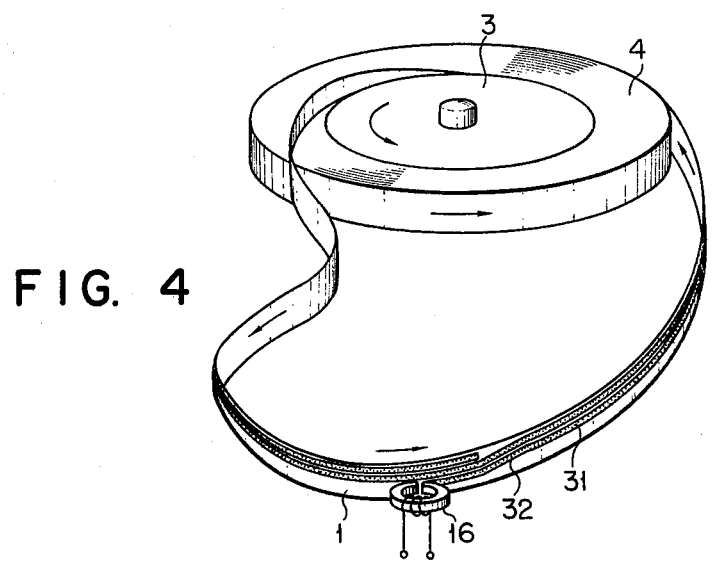
FIG. 4 is a schematic oblique view showing the relative positions of the tracks of an endless tape and a magnetic head.

Recording of video signals in the endless tape-running apparatus of the above-mentioned construction is effected along tracks shown in FIG. 4. These tracks are formed so as to extend almost annularly along the full length of an endless tape wound into a roll. The respective adjacent tracks are mutually connected by the inclined portions 32 as illustrated in FIG. 4. Thus, all the tracks collectively constitute a single helical line.

For example, where FM video signals are densely recorded using the above-mentioned endless tape-running apparatus, a considerably short tape is only required to effect said recording and the subsequent reproduction in a time generally considered necessary. Where a track pitch is chosen to be, for example, 60 microns, then recording can be carried out in 180 tracks with a commonly used ½ inch endless tape. Therefore, only a 100 meter long tape well serves the purpose of making 30-minute recording and reproduction.

It has been found that even where and endless tape is run at a higher speed than 5 meters per second (about 10 meters per second in this embodiment) by the apparatus of this invention, the tape can travel in a very stable condition, minimizing wows and flutters of a reproduced image. This advantageous effect is supposed to originate, as previously mentioned, with the fact that the centrifugal force which a rapidly rotating tape roll undergoes is offset by a restricting force intentionally applied according to the present invention. The centrifugal force is known to act on the unit length of a tape in the radial direction of its roll with a magnitude of $mv^2/r$ (where $r$ denotes the radius of the tape roll). The centrifugal force applies a resultant tensional force $Tc$ lengthwise of the tape with a magnitude expressed by the following equation:

$$Tc = r \times \frac{mv^2}{r} = mv^2 \qquad (4)$$

As seen from the above equation, the tensional force $Tc$ is always applied with a magnitude independent of any point in the radial direction of the tape roll 4. In this case, the rubber roll assembly 5 pressed against the underside of the tape roll 4 according to this invention prevents the respective turns of the tape roll 4 from being shifted toward the periphery of the tape roll 4, namely, the diameter of the tape roll 4 itself from being broadened. As the result, the respective turns of the tape roll 4 can be closely arranged at a substantially equal interval in the radial direction, reducing or equalizing contact frictions between the respective turns and consequently attaining the stable travel of the drawn out tape.

There will now be described the experiments of measuring the relationship of the traveling speed of a tape 1 driven by a tape-running apparatus according to the foregoing embodiment and the traveling stability of the tape 1, namely, the resultant occurrence of wows and flutters in the video signals obtained.

Reference is first made to the method of measuring the wows and flutters. A magnetic tape 1 is stored with video signals obtained through the frequency modulation of a carrier wave of 1 MHz by a sine wave of 3 KHz. The stored video signals are scanned by a magnetic head 16 and demodulated in the form of 3 KHz signals. The changed frequency $\Delta f$ of said reproduced video signals is determined by a wow meter from an output representing the ratio $\Delta f/f$ of the original frequency $f$ to the changed frequency $\Delta f$.

A 90-meter long tape was run at various speeds of 3 meters, 5 meters, 10 meters and 14 meters per second using capstans of different diameters with the rotation of a motor fixed at 3600 r.p.m. Determination was made by an electromagnetic oscillograph of wows and flutters occurring in video signals with respect to said 90-meter long tape, the results being set forth in FIGS. 6A to 6D. Throughout the oscillograms of FIGS. 6A to 6D, the abscissa represents time (second) and the ordinate shows wows and flutters or $\Delta f/f$ in percentage. In these oscillograms, time is plotted on a short abscissa. As the result, wows consisting of relatively long waves, namely, repetitive waves generally having a frequency of several Hz units do not appear clearly, but flutters formed of relatively short waves, namely, repetitive waves generally having a frequency of more than 60Hz units are mainly indicated. As seen from said oscillograms, flutters become prominent for the 3 m/sec. traveling speed of a tape (FIG. 6A), but decrease for the 5 m/sec. speed (FIG. 6B), 10 m/sec. speed (FIG. 6C) and 14 m/sec. (FIG. 6D).

FIG. 7 is a graphic representation of the above-mentioned results of measurement with the traveling speed of a tape 1 plotted on the abscissa and the percentage values of wows and flutters on the ordinate. FIG. 7 also shows that where the traveling speed of a tape 1 rises above 5 meters per second, then both wows and flutters are reduced.

Experiments were made with tapes having optional lengths ranging from 50 to 150 meters run by the tape-running apparatus according to the foregoing embodiment at different speeds of 3 meters, 5 meters, 10 meters and 14 meters per second, the results being set forth in FIGS. 8 and 9. These figures indicate that wows and flutters tend to increase as a tape 1 becomes longer, but that where the tape 1 is made to travel at a higher speed than 5 meters per second, then wows and flutters are rapidly reduced. The reason for the former event is assumed to be that the increased tape length leads to a greater friction between the respective turns of a tape roll 4 and the restricting means 5 thereof, thereby causing the aforesaid aggregate frictional force Tv containing unstable factors to occupy a larger proportion in the overall tensional force T. Wows and flutters associated with the tape length can be decreased to a certain extent by reducing the above-mentioned friction through improvement of tape material and means for restricting a tape roll 4. As estimated from the results of the previously described experiments, the endless tape-running apparatus of this invention can be practically used with an endless tape having a length of 300 meters at maximum.

Where an endless tape 1 about 100 meters long was run at a speed of 10 meters per second by the apparatus of this invention to record video signals through frequency modulation, then wows and flutters became little prominent, rendering a reproduced image extremely distinct.

The above-mentioned embodiment wherein the tape guides all consist of fixed poles in place of rotary rolls used with an ordinary tape-running device can suppress flutters caused by the uneven running of such tapes. Further, since a tape roll 4 passes the magnetic head 16 to rapidly travel along the outer surface of the magnetic head-facing guide 12 disposed very close to the capstan 10, a film of air is formed between the traveling tape 1 and the outer surface of the magnetic head-facing guide 12, preventing the horizontal shaking of the tape 1 and in consequence reducing flutters arising from such shaking. The crosswise or vertical displacement and shaking of a traveling tape 1 are restricted by the third fixed guide pole 9 and the guide rail 14 of the magnetic head-facing guide 12. These guiding means 9, 12, 14 cooperate in holding the tape surface accurately at right angles to the surface of the substrate 2 at the magnetic head 16, thereby noticeably elevating the tracking accuracy of the stationary magnetic head 16.

The capstan 10 which is chosen to have as large a diameter as design permits can minimize a periodic variation in the traveling speed of a tape 1 which might arise due to the eccentricity of the capstan shaft with the resultant occurrence of flutters. If, in case the capstan shaft happens to have an eccentricity of, for example, 5 microns, the capstan 10 is chosen to have a diameter of 53 mm, then the variation of the traveling speed of a tape 1 will only amount to 5 microns/3300 microns ÷ 0.001 percent, a substantially negligible value.

The magnetic head 16 of the subject endless tape-running apparatus for recording and reproducing video signals is provided with an electrical circuit to treat said video signals. Since, however, this circuit may consist of a known type, description thereof is omitted.

Figures 5A, 5B:
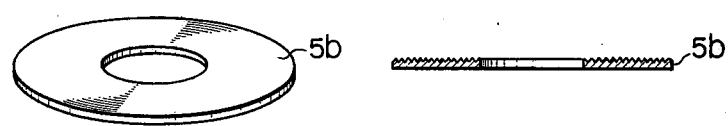
FIGS. 5A and 5B are oblique and sectional views of a tape-restricting plate used in place of the restricting rolls of FIG. 3.

The foregoing description refers to the case where the restricting means 5 for preventing the respective turns of a rapidly rotating tape roll 4 from being shifted toward the outer periphery of said tape roll 4 consisted of rubber rolls 5a. However, this invention is not limited to this embodiment. Any type of restricting means can well serve the purpose, provided it can appreciably restrict the outward displacement of the respective turns of the tape roll 4 in the radial direction thereof. It is possible to replace the aforesaid restricting means 5 consisting of rubber rolls 5a by a rotatable metal or plastic disc 5b, as shown in FIGS. 5A and 5B, bored at the center with an opening penetrated by the rotary shaft 3a of the reel 3, provided with a large number of annular engagement grooves on the surface contacting the lower end face of the tape roll 4. Further, this disc 5b may be substituted by a plurality of columnar or semicolumnar support members which are fixed instead of being made rotatable like the rubber rolls 5a of FIGS. 2 and 3 and are provided on the surface with numerous grooves which engage the lower edges of the respective turns of the tape roll 4 during its rotation.

The endless tape used with the tape-running apparatus of this invention need not be of magnetic type, but may consist of a type having a recording groove. A transducer used in this case in place of a magnetic head consists of, for example, a piezoelectric element capable of reproducing video signals recorded by the groove, as is well known to those skilled in the art. It is also possible to use a transparent tape and record signals in bright and dark shades in tracks extending parallel with the traveling direction of an endless tape and optically detect said signals.

What we claim is:

1. A magnetic recording and reproducing apparatus comprising: a substrate;
   a rotatable reel mounted on said substrate;
   an endless magnetic tape wound about said rotatable reel to form an endless tape roll thereon, said endless magnetic tape having a length less than 300 meters;
   a non-rotatable magnetic head;
   guide means for drawing out the tape from said endless tape roll, starting with the innermost periphery of said tape roll and guiding the drawn out tape so as again to take it up on the outermost periphery of said tape roll, said guide means including a rotatable capstan and two pinch rolls disposed on opposite sides thereof so that the tape passing between the capstan and one of the pinch rolls is scanned by said magnetic head and passes between the capstan and the other pinch roll;
   drive means for running the drawn out tape at a speed greater than 5 meters per second through said guide means; and
   a plurality of rollers, at least the peripheral surfaces of which are rubber, being horizontally disposed on the surface of said substrate at spaced intervals around said rotatable reel and disposed therebeneath, said rollers extending in the radial direction of said rotatable reel, so that the lower end face of said tape roll contacts said rubber surfaces of said rollers, whereby said tape roll receives a force opposing a centrifugal force generated on the rapidly rotating tape roll.

2. An endless tape-running apparatus according to claim 1 wherein the guide means comprises a plurality of guide poles fixed on the substrate, the first and second guide poles of which are inclined to the surface of the substrate to guide the tape drawn out from the innermost periphery of the tape roll in a perpendicular position relative to the substrate surface, and the third guide pole of which is flanged at both top and bottom ends and erected straight upright on the substrate surface, thereby restricting the vertical shaking of the tape delivered from the second guide pole; and means for buffering the drawn out tape.

3. An endless tape-running apparatus according to claim 2 wherein said magnetic head is one for recording video signals in, and reproducing them from, the tape forwarded from the capstan.

4. An endless tape-running apparatus according to claim 3 wherein the guide means further includes a magnetic headfacing guide provided with a segmental plane on the side adjacent to the magnetic head and a rail for restricting the horizontal shaking of the tape sliding over said segmental plane after leaving the capstan.

5. An endless tape-running apparatus according to claim 2 wherein the buffering means includes a guide wall mounted on the substrate and extending to the reel from the capstan to guide the tape from the capstan and at least one guide pole to convert the advancing direction of the tape guide by the guide wall to form a loosened portion of the running tape.

* * * * *